(12) United States Patent
Rodriguez et al.

(10) Patent No.: US 8,844,954 B2
(45) Date of Patent: Sep. 30, 2014

(54) STEERING SYSTEMS

(71) Applicant: GM Global Technology Operations LLC, Detroit, MI (US)

(72) Inventors: Marco E. Rodriguez, Macomb Township, MI (US); Miroslaw Zaloga, Shelby Township, MI (US); Christopher J. Mielke, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 56 days.

(21) Appl. No.: 13/664,936

(22) Filed: Oct. 31, 2012

(65) Prior Publication Data

US 2014/0116173 A1 May 1, 2014

(51) Int. Cl.
*B62D 7/18* (2006.01)
*B62D 7/22* (2006.01)
*B62D 3/08* (2006.01)

(52) U.S. Cl.
CPC ........................................ *B62D 3/08* (2013.01)
USPC ................... 280/93.512; 280/89.11; 180/427; 180/431; 74/409; 74/493; 74/499

(58) Field of Classification Search
USPC .......... 280/89.11, 93.512; 180/426, 427, 431; 74/409, 493, 499
See application file for complete search history.

(56) References Cited

U.S. PATENT DOCUMENTS

| | | | | |
|---|---|---|---|---|
| 2,710,596 A | * | 6/1955 | Folkerts | 91/372 |
| 2,755,778 A | * | 7/1956 | Loofbourrow et al. | 91/378 |
| 2,953,932 A | * | 9/1960 | Lincoln | 74/388 PS |
| 3,033,051 A | * | 5/1962 | Reinke et al. | 91/375 A |
| 3,170,338 A | * | 2/1965 | Ivanchich | 74/499 |
| 3,241,630 A | * | 3/1966 | Snabes et al. | 180/405 |
| 4,294,159 A | * | 10/1981 | Wendler et al. | 91/375 A |
| 4,483,237 A | * | 11/1984 | Elser | 91/368 |
| 5,341,701 A | * | 8/1994 | Krom et al. | 74/499 |
| 5,953,960 A | * | 9/1999 | Venable | 74/409 |
| 6,019,012 A | * | 2/2000 | Cartwright | 74/409 |
| 6,065,561 A | * | 5/2000 | Howard | 180/441 |
| 6,070,483 A | * | 6/2000 | Gilbert | 74/409 |
| 2009/0199667 A1 | * | 8/2009 | Menjak et al. | 74/424.7 |

* cited by examiner

*Primary Examiner* — Ruth Ilan
*Assistant Examiner* — Darlene P Condra
(74) *Attorney, Agent, or Firm* — Quinn Law Group, PLLC

(57) ABSTRACT

A steering system includes a wheel rotatable between on-center and off-center positions, and a shaft having teeth. The shaft defines a cavity and is rotatable about an axis that is perpendicular to the teeth. The system includes a nut having cogs defining grooves therebetween, wherein each tooth is matable with a groove. The system includes a lash adjuster translatable within the cavity, and a retainer contacting the adjuster and shaft, and configured for positioning the shaft along the axis as the wheel rotates. A center one of the gear teeth meshes with one of the grooves to define a first gap having a first thickness therebetween when the wheel is in the on-center position. An outer one of the gear teeth meshes with an outer groove to define a second gap having a second thickness that is greater than the first thickness when the wheel is in the off-center position.

17 Claims, 4 Drawing Sheets

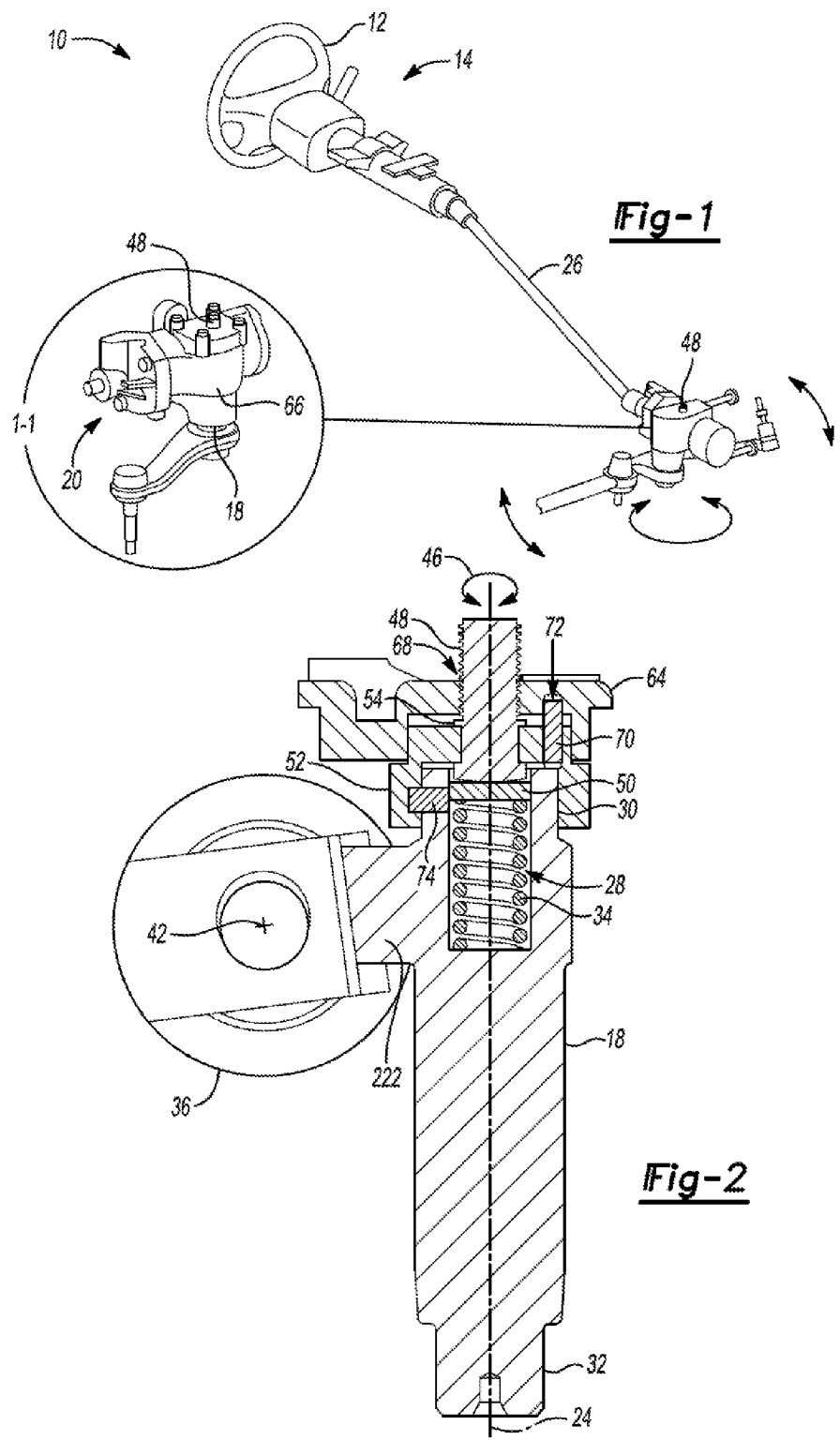

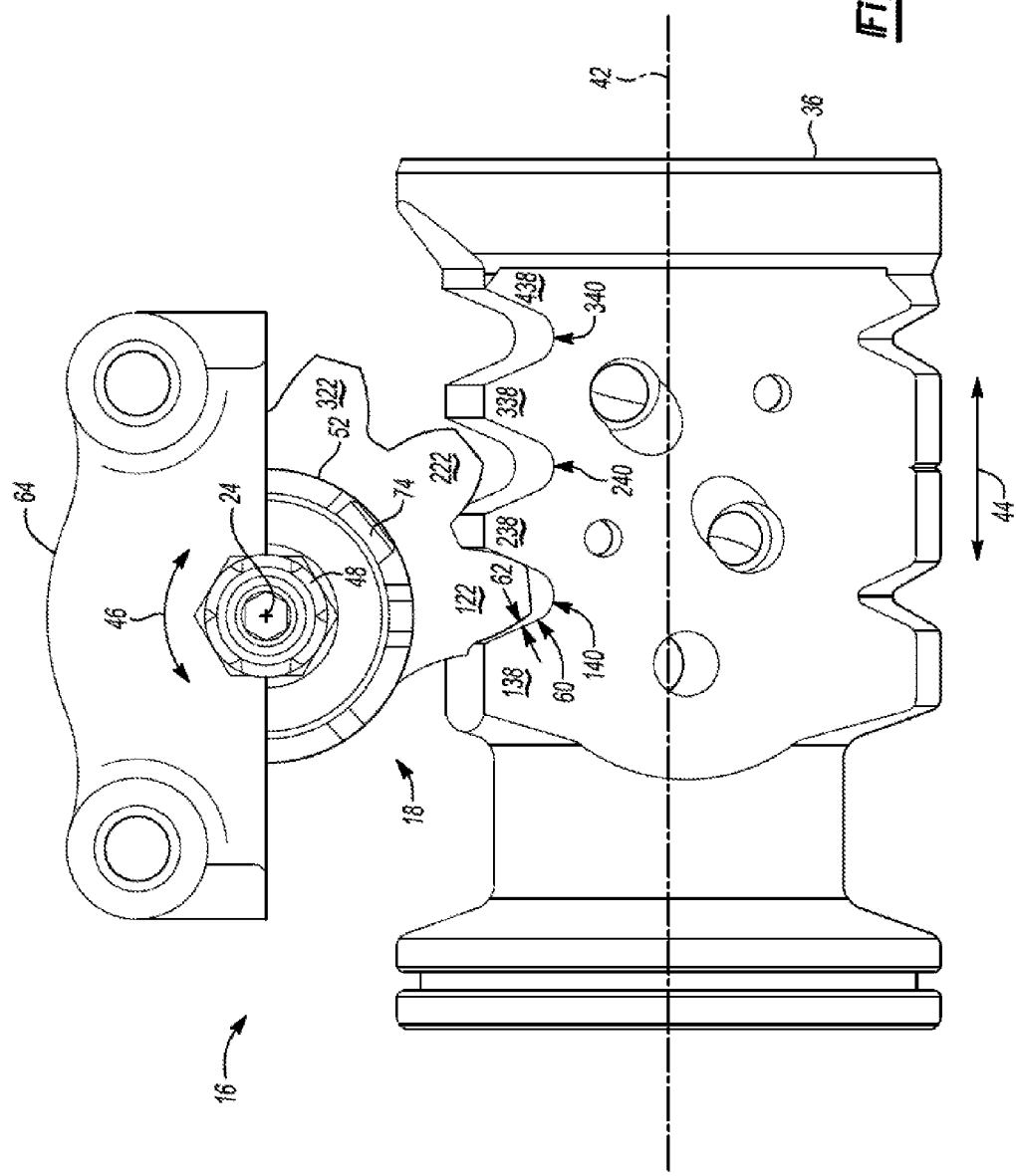

STEERING SYSTEMS

TECHNICAL FIELD

The disclosure relates to a steering system.

BACKGROUND

Steering systems for vehicles may include a sector shaft rotatable against a rack ball nut to thereby steer vehicle wheels in a desired direction. More specifically, a steering wheel of the vehicle may rotate between an on-center position and an off-center position and thereby rotate the sector shaft with respect to the rack ball nut via intermeshing gear teeth. As such, alignment of the sector shaft with respect to the rack ball nut contributes to the effectiveness and ease of operation of the steering system.

SUMMARY

A steering system includes a steering wheel rotatable between an on-center position and an off-center position, and a sector shaft having a plurality of gear teeth protruding therefrom. The sector shaft defines a cavity therein and is rotatable about a central longitudinal axis that is substantially perpendicular to the plurality of gear teeth as the steering wheel rotates between the on-center position and the off-center position. The steering system also includes a rack ball nut having a plurality of cogs extending therefrom and defining a plurality of grooves therebetwen. Further, each of the plurality of gear teeth is matable with a respective one of the plurality of grooves. The steering system includes a lash adjuster translatable within the cavity along the central longitudinal axis, and a retainer disposed in contact with the lash adjuster and the sector shaft. The retainer is configured for positioning the sector shaft along the central longitudinal axis as the steering wheel rotates between the on-center position and the off-center position. A center one of the plurality of gear teeth meshes with a center one of the plurality of grooves to define a first gap having a first thickness between the center one of the plurality of gear teeth and one of the plurality of cogs when the steering wheel is disposed in the on-center position. An outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position.

In one embodiment, the sector shaft has a locator pin protruding therefrom, and the lash adjuster has an annular shoulder. The retainer is disposed in contact with the annular shoulder and the sector shaft, and is not rotatable about the central longitudinal axis. Further, the steering system includes a resilient member disposed within the cavity and a washer sandwiched between the resilient member and the lash adjuster. The steering system also includes an end cap cover disposed in contact with the retainer and threadably mated to the lash adjuster, wherein the end cap cover is not rotatable about the central longitudinal axis. The lash adjuster is rotatable with respect to the end cap cover to compress the resilient member and thereby decrease the first thickness. Moreover, the retainer, the locator pin, the lash adjuster, and the resilient member suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

In another embodiment, the sector shaft has three gear teeth, and is rotatable about the central longitudinal axis that is substantially perpendicular to the three gear teeth as the steering wheel rotates between the on-center position and the off-center position. Further, the rack ball nut is translatable along an axis that is substantially perpendicular to the central longitudinal axis as the steering wheel rotates between the on-center position and the off-center position. The rack ball nut has four cogs extending therefrom and defining three grooves therebetween, and each of the three gear teeth is matable with a respective one of the three grooves. Further, the retainer is not rotatable about the central longitudinal axis, includes a peg extending therefrom and disposed parallel to the central longitudinal axis, and defines an annular channel therein configured for receiving the locator pin and having a guide surface including a notch. The end cap cover is not rotatable about the central longitudinal axis and defines a hole configured for receiving the peg so that the retainer does not rotate with respect to the end cap cover about the central longitudinal axis. A center one of the three gear teeth meshes with a center one of the three grooves to define a first gap having a first thickness between the center one of the three gear teeth and one of the four cogs when the steering wheel is disposed in the on-center position. An outer one of the three gear teeth meshes with an outer one of the three grooves to define a second gap having a second thickness that is greater than the first thickness between the outer one of the three gear teeth and an outer one of the four cogs when the steering wheel is disposed in the off-center position. Further, the locator pin translates away from the notch and spaces each of the three gear teeth away from a respective one of the four cogs as the steering wheel rotates from the on-center position to the off-center position. The locator pin rests within the notch and translates each of the three gear teeth towards a respective one of the four cogs as the steering wheel rotates from the off-center position to the on-center position.

The detailed description and the drawings or Figures are supportive and descriptive of the disclosure, but the scope of the disclosure is defined solely by the claims. While some of the best modes and other embodiments for carrying out the claims have been described in detail, various alternative designs and embodiments exist for practicing the disclosure defined in the appended claims.

BRIEF DESCRIPTION OF THE DRAWINGS

FIG. 1 is a schematic perspective illustration of a steering system including a steering wheel and an integral gear, shown enlarged at circle 1-1, having a sector shaft and a rack ball nut;

FIG. 2 is a schematic illustration of a cross-sectional view of the sector shaft and rack ball nut of FIG. 1;

FIG. 3B is a schematic illustration of a top view of the sector shaft and rack ball nut of FIG. 3A, wherein the sector shaft is disposed in an off-center position;

DETAILED DESCRIPTION

Figure 3A:
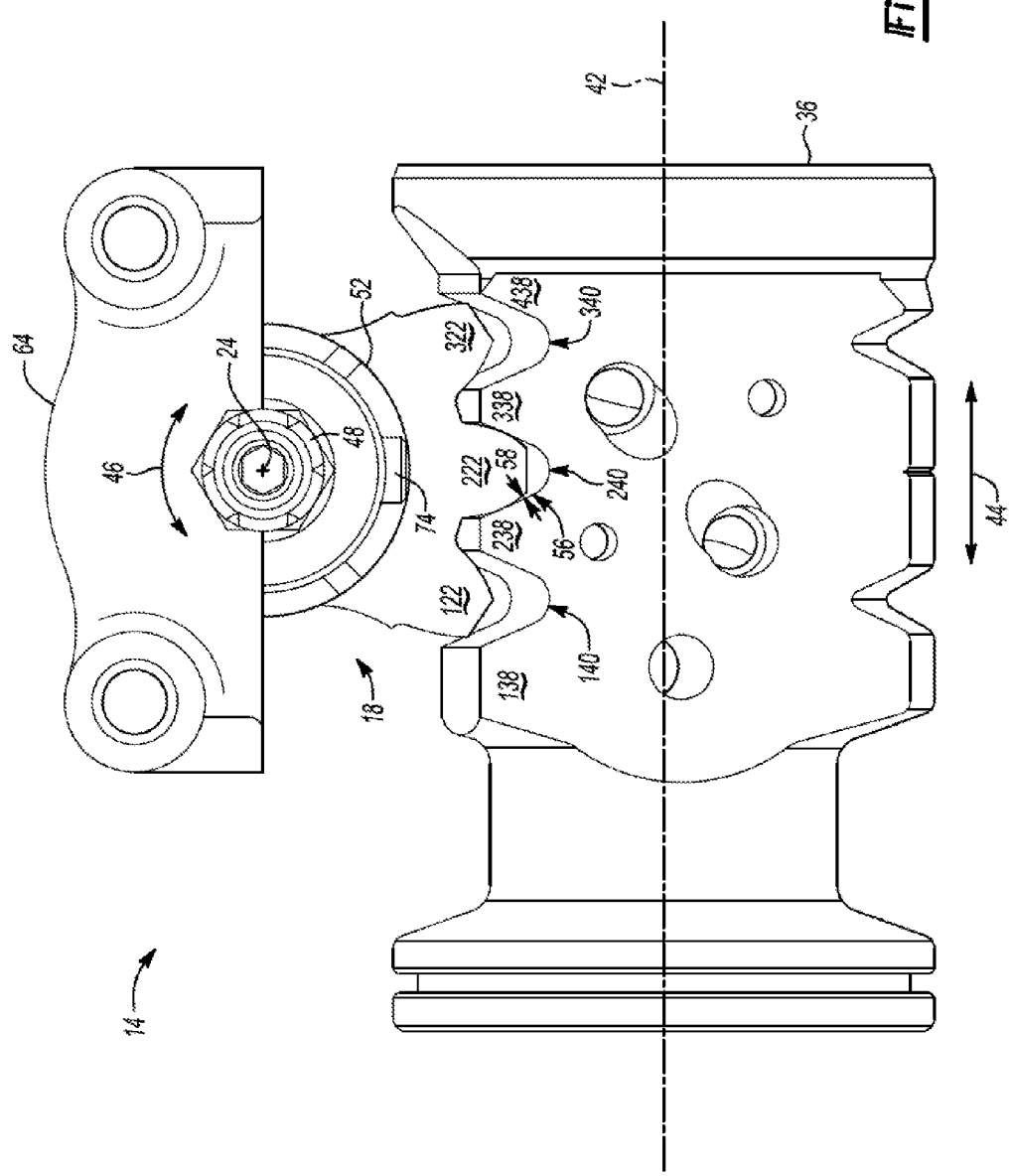
FIG. 3A is a schematic illustration of a top view of the sector shaft and rack ball nut of FIGS. 1 and 2, wherein the sector shaft is disposed in an on-center position.

Referring to the Figures, wherein like reference numerals refer to like elements, a steering system 10 is shown generally in FIG. 1. The steering system 10 may be useful for vehicles, such as automotive vehicles, that require precise and efficient steering without steering wheel play, vehicle drift, or vehicle wander during steering maneuvers. Therefore, the steering system 10 may also be useful for non-automotive vehicles, such as, but not limited to, recreational vehicles.

Figure 4A:
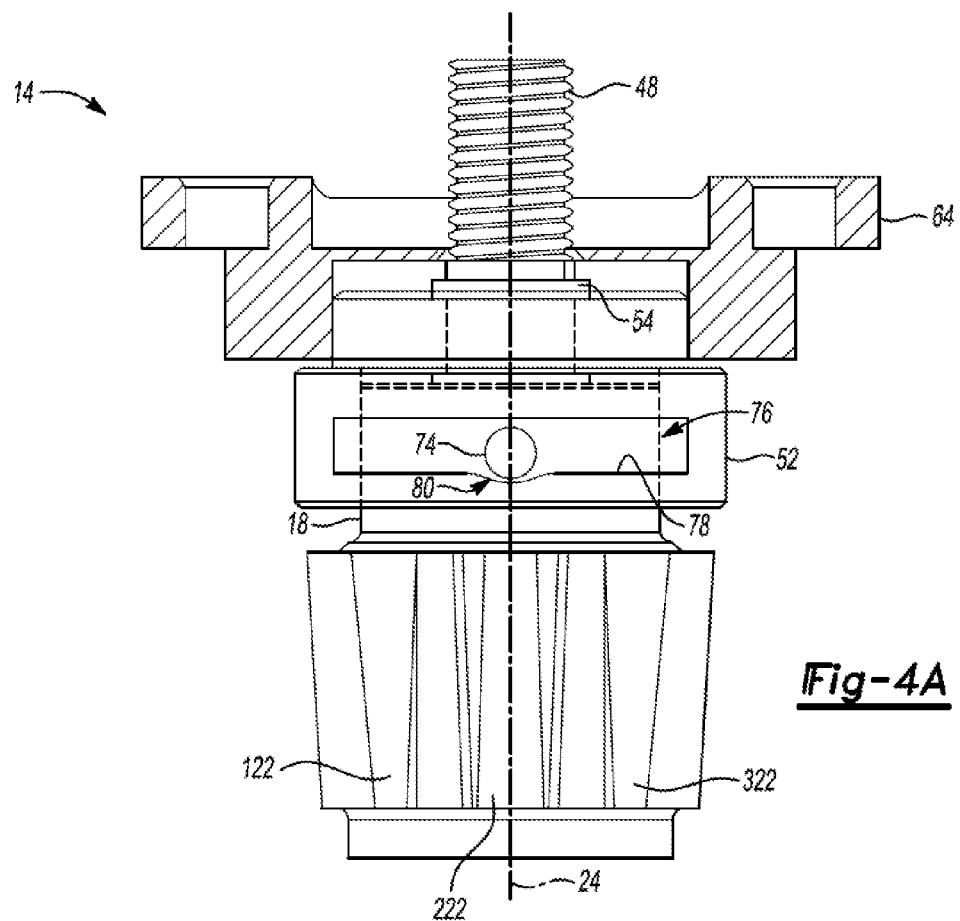
FIG. 4A is a schematic illustration of a partly cross-sectional side view of a portion of the sector shaft of FIGS. 1-3B, wherein the sector shaft is disposed in the on-center position.
Figure 4B:
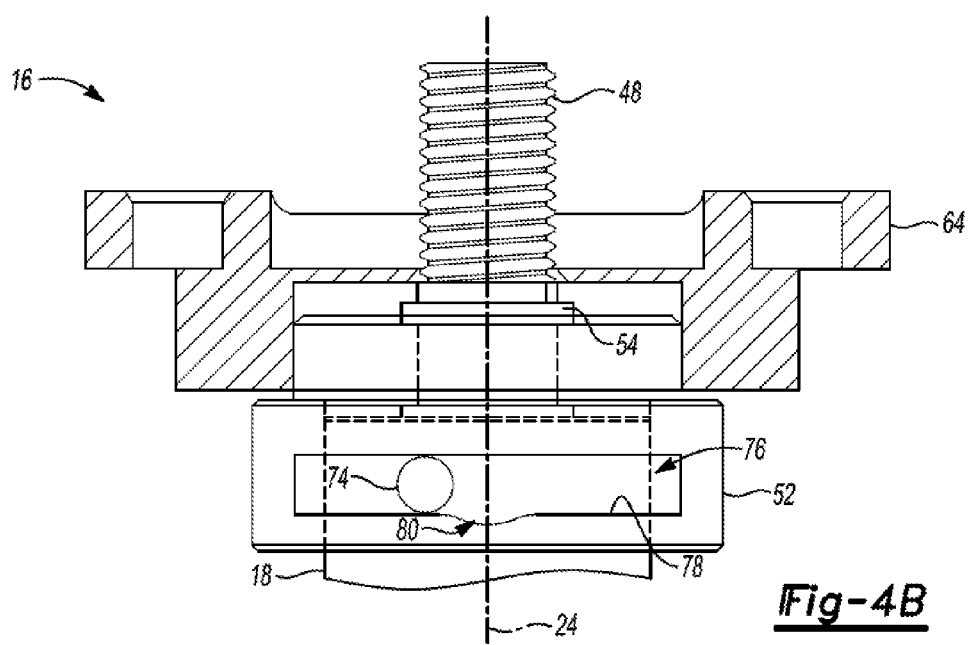
FIG. 4B is a schematic illustration of a partly cross-sectional side view of a portion of the sector shaft of FIG. 4A, wherein the sector shaft is disposed in the off-center position.

Referring now to FIG. 1, the steering system 10 includes a steering wheel 12 rotatable between an on-center position (shown generally at 14 in FIGS. 1, 3A, and 4A) and an off-center position (shown generally at 16 in FIGS. 3B and 4B). That is, the on-center position 14 may orient each wheel (not shown) of a vehicle parallel to every other wheel so that the vehicle does not turn, but rather travels along a straight path. Conversely, the off-center position 16 may turn the front wheels of the vehicle with respect to the rear wheels of the vehicle so that the vehicle may steer through a left- or right-hand turn.

With continued reference to FIG. 1, the steering system 10 also includes a sector shaft 18. The sector shaft 18 may be characterized as a Pitman shaft, and the steering system 10 may be generally characterized as a Pitman power steering system, as opposed to a rack and pinion power steering system (not shown). Further, the sector shaft 18 may be a component of an integral gear, which is shown enlarged at 20 in circle 1-1 of FIG. 1.

As best shown in FIGS. 3A and 3B, the sector shaft 18 has a plurality of gear teeth 122, 222, 322 protruding therefrom. Although the sector shaft 18 may have any number of gear teeth 122, in one non-limiting example, the sector shaft 18 may have three gear teeth 122, 222, 322 protruding therefrom. Further, as best shown in FIG. 2, the sector shaft 18 is rotatable about a central longitudinal axis 24 that is substantially perpendicular to the plurality of gear teeth 122, 222, 322 as the steering wheel 12 (FIG. 1) rotates between the on-center position 14 (FIG. 3A) and the off-center position 16 (FIG. 3B). That is, referring to FIG. 1, the sector shaft 18 may be operatively connected to the steering wheel 12 via one or more steering linkages 26 or components and may rotate about the central longitudinal axis 24 (FIG. 2) when the steering wheel 12 is turned from the on-center position 14 to the off-center position 16.

With continued reference to FIG. 2, the sector shaft 18 defines a cavity 28 therein. More specifically, the sector shaft 18 may have a proximal end 30 defining the cavity 28 therein, and a distal end 32 spaced apart from the proximal end 30 along the central longitudinal axis 24. The cavity 28 may be configured for receiving a resilient member 34, as set forth in more detail below. Further, as set forth above, in one non-limiting example, the sector shaft 18 may include three gear teeth 122, 222, 322 protruding from the proximal end 30.

Referring now to FIGS. 3A and 3B, the steering system 10 (FIG. 1) also includes a rack ball nut 36 having a plurality of cogs 138, 238, 338, 438 extending therefrom and defining a plurality of grooves 140, 240, 340 therebetween, wherein each of the plurality of gear teeth 122, 222, 322 is matable with a respective one of the plurality of grooves 140, 240, 340. Although the rack ball nut 36 may have any number of cogs 138, in one non-limiting example, the rack ball nut 36 may have four cogs 138, 238, 338, 438 extending therefrom and may define three grooves 140, 240, 340 therebetween. Therefore, each of the three gear teeth 122, 222, 322 may mate or mesh with a respective one of the plurality of three grooves 140, 240, 340 as the steering wheel 12 (FIG. 1) rotates between the on-center position 14 (FIG. 3A) and the off-center position 16 (FIG. 3B). More specifically, the steering wheel 12 may rotate between the on-center position 14 and the off-center position 16 to translate the rack ball nut 36 along an axis 42 that is substantially perpendicular to the central longitudinal axis 24, and thereby rotate the sector shaft 18 about the central longitudinal axis 24. That is, as best shown in FIG. 3A, the rack ball nut 36 may translate along the axis 42 in the direction of arrow 44 and thereby rotate the sector shaft 18 about the central longitudinal axis 24 in the direction of arrow 46.

Referring again to FIG. 2, the steering system 10 (FIG. 1) also includes a lash adjuster 48 translatable within the cavity 28 along the central longitudinal axis 24. As set forth in more detail below, the lash adjuster 48 may be configured for minimizing lash between the plurality of gear teeth 122, 222, 322 (FIG. 3A) and the plurality of cogs 138, 238, 338, 438 (FIG. 3A) when the steering wheel 12 (FIG. 1) is disposed in the on-center position 14 (FIG. 3A). As used herein, the terminology "lash" describes any spacing or tolerance between a gear tooth 122 and a respective one 138, 238 of the plurality of cogs 138, 238, 338, 438. That is, lash describes a condition in which a space exists between the faces of meshing gear teeth 122, 222, 322 and cogs 138, 238, 338, 438, i.e., in which the gear tooth 122 does not mesh with a respective one 138, 238 of the plurality of cogs 138, 238, 338, 438 via an exact interference fit. Such lash requires additional wasted work input, e.g., turning the steering wheel 12 an additional number of degrees, to bring the gear teeth 122, 222, 322 and cogs 138, 238, 338, 438 into contact when changing direction of the vehicle. The additional wasted work input may be described as unloaded rotation of the steering wheel 12 upon changing vehicle direction or trying to maintain straight-line steering when the steering wheel 12 is disposed in the on-center position 14. Lash may be felt by an operator of the vehicle as imprecise steering, vehicle wander, vehicle pull or lead, lack of steering response, steering wheel play, and/or steering vagueness when the steering wheel 12 is disposed in the on-center position 14. As such, lash may be undesirable when the steering wheel 12 is disposed in the on-center position 14, and may be minimized by contact between the gear tooth 222 and the respective one 238, 338 of the plurality of cogs 138, 238, 338, 438 when the steering wheel 12 is disposed in the on-center position 14.

As best shown in FIG. 2, the steering system 10 (FIG. 1) may also include the resilient member 34, e.g., a coil spring, disposed within the cavity 28 of the sector shaft 18, and a washer 50 sandwiched between the resilient member 34 and the lash adjuster 48. That is, the lash adjuster 48 may be configured as a threaded bolt, and may be configured to compress the resilient member 34 and thereby decrease lash between the gear teeth 222 and cogs 238, 338 when the steering wheel 12 (FIG. 1) is disposed in the on-center position 14 (FIG. 3A), as set forth in more detail below.

With continued reference to FIG. 2, the steering system 10 (FIG. 1) further includes a retainer 52 disposed in contact with the lash adjuster 48 and the sector shaft 18 and configured for positioning the sector shaft 18 along the central longitudinal axis 24 as the steering wheel 12 (FIG. 1) rotates between the on-center position 14 (FIG. 3A) and the off-center position 16 (FIG. 3B). The retainer 52 may be disposed in contact with the sector shaft 18 at the proximal end 30, but may not rotate about the central longitudinal axis 24 as the sector shaft 18 rotates about the central longitudinal axis 24, as set forth in more detail below. Further, as best shown in FIG. 2, the lash adjuster 48 may have an annular shoulder 54 disposed in contact with the retainer 52, and the lash adjuster 48 may be rotatable with respect to the retainer 52.

Referring now to FIGS. 3A and 3B, in operation, a center one 222 of the plurality of gear teeth 122, 222, 322 meshes with a center one 240 of the plurality of grooves 140, 240, 340 to define a first gap 56 (FIG. 3A) having a first thickness 58 (FIG. 3A) between the center one 222 of the plurality of gear teeth 122, 222, 322 and one 238, 338 of the plurality of cogs 138, 238, 338, 438 when the steering wheel 12 (FIG. 1) is disposed in the on-center position 14 (FIG. 3A). That is, the first thickness 58 may correspond to lash between the center one 222 of the plurality of gear teeth 122, 222, 322 and one 238, 338 of the plurality of cogs 138, 238, 338, 438, and may be minimized by the steering system 10 (FIG. 1).

Further, referring to FIG. 3B, during operation of the steering system 10 (FIG. 1), an outer one 122 of the plurality of gear teeth 122, 222, 322 meshes with an outer one 140 of the plurality of grooves 140, 240, 340 to define a second gap 60 having a second thickness 62 that is greater than the first thickness 58 (FIG. 3A) between the outer one 122 of the plurality of gear teeth 122, 222, 322 and an outer one 138 of the plurality of cogs 138, 238, 338, 438 when the steering wheel 12 (FIG. 1) is disposed in the off-center position 16. That is, the second thickness 62 may correspond to lash between the outer one 122 of the plurality of gear teeth 122, 222, 322 and the outer one 138 of the plurality of cogs 138, 238, 338, 438, and may be maintained, e.g., may not be minimized, by the steering system 10.

More specifically, as described with reference to FIG. 2, the steering system 10 (FIG. 1) may further include an end cap cover 64. The end cap cover 64 may be bolted to an exterior housing 66 (FIG. 1) of the integral gear 20 (FIG. 1) and as such, may be stationary or fixed with respect to the sector shaft 18 and the rack ball nut 36. Stated differently, the end cap cover 64 is not rotatable about the central longitudinal axis 24. Further, the end cap cover 64 is disposed in contact with the retainer 52 and is threadably mated to the lash adjuster 48. In particular, the lash adjuster 48 may be inserted into a bore 68 defined by the end cap cover 64 and may be threadably mated to the end cap cover 64 such that rotation of the lash adjuster 48 may compress the resilient member 34 along the central longitudinal axis 24. More specifically, the lash adjuster 48 may be rotatable with respect to the end cap cover 64, e.g., in a direction indicated by arrow 46, to translate the washer 50 along the central longitudinal axis 24 towards the distal end 32, compress the resilient member 34, and thereby decrease the first thickness 58 (FIG. 3A).

In particular, with continued reference to FIG. 2, the retainer 52 may include a peg 70 extending therefrom and disposed parallel to the central longitudinal axis 24. Further, the end cap cover 64 may define a hole 72 therein configured for receiving the peg 70 so that the retainer 52 does not rotate with respect to the end cap cover 64 about the central longitudinal axis 24. That is, although the lash adjuster 48 and sector shaft 18 may each rotate about the central longitudinal axis 24, the peg 70 may prevent the retainer 52 from rotating with respect to the end cap cover 64.

Referring again to FIG. 2, the sector shaft 18 may further include a locator pin 74 protruding therefrom at the proximal end 30 and disposed substantially perpendicular to the central longitudinal axis 24. That is, the locator pin 74 may be disposed substantially parallel to the plurality of gear teeth 122, 222, 322.

In addition, as best shown in FIGS. 4A and 4B, the retainer 52 may define an annular channel 76 therein configured for receiving the locator pin 74 and having a guide surface 78 including a notch 80 or depression. That is, the locator pin 74 may insert into the annular channel 76 and may, at times, ride along the guide surface 78 and/or rest within the notch 80 or depression as the steering wheel 12 (FIG. 1) rotates between the on-center position 14 (FIG. 3A) and the off-center position 16 (FIG. 3B).

More specifically, referring to FIG. 4A, the locator pin 74 may be disposed within the notch 80 or depression when the steering wheel 12 (FIG. 1) is disposed in the on-center position 14 to thereby minimize the first thickness 58 (FIG. 3A). Conversely, referring to FIG. 4B, the locator pin 74 may not be disposed within the notch 80 or depression when the steering wheel 12 is disposed in the off-center position 16 to thereby maintain the second thickness 62 (FIG. 3B).

In further detail, as described with continued reference to FIGS. 4A and 4B, the locator pin 74 may translate away from the notch 80 or depression, e.g., along the guide surface 78, so that the retainer 52 lifts the sector shaft 18 along the central longitudinal axis 24 toward the end cap cover 64, and thereby spaces each of the plurality of gear teeth 122, 222, 322 away from a respective one of the plurality of cogs 138, 238, 338, 438 (FIG. 3B) as the steering wheel 12 (FIG. 1) rotates from the on-center position 14 (FIG. 4A) to the off-center position 16 (FIG. 4B). It is to be appreciated that the sector shaft 18 may lift only slightly along the central longitudinal axis 24, e.g., from about 0.1 mm to about 0.3 mm. As the retainer 52 and locator pin 74 lift the sector shaft 18, each of the plurality of gear teeth 122, 222, 322 moves away from a respective one of the plurality of cogs 138, 238, 338, 438 to maintain the second thickness 62 (FIG. 3B). Therefore, the steering system 10 (FIG. 1) may maintain the second thickness 62 or lash between the outer gear tooth 122 and the outer cog 138 when the steering wheel 12 is disposed in the off-center position 16. Such lash or second gap 60 may subsequently assist an operator in turning the steering wheel 12 to again return the steering wheel 12 from the off-center position 16 to the on-center position 14. That is, because the steering system 10 maintains the second gap 60 (FIG. 3B), the plurality of gear teeth 122, 222, 322 may not bind up with respect to the plurality of cogs 138, 238, 338, 438 when the steering wheel 12 is rotated from the off-center position 16.

Conversely, with continued reference to FIGS. 4A and 4B, the locator pin 74 may rest within the notch 80 or depression so that the retainer 52 drops the sector shaft 18 along the central longitudinal axis 24 away from the end cap cover 64, and thereby translates each of the plurality of gear teeth 122, 222, 322 towards the respective one of the plurality of cogs 138, 238, 338, 438 (FIG. 3A) as the steering wheel 12 (FIG. 1) rotates from the off-center position 16 (FIG. 4B) to the on-center position 14 (FIG. 4A). Again, it is to be appreciated that the sector shaft 18 may drop only slightly along the central longitudinal axis 24, e.g., from about 0.1 mm to about 0.3 mm. As the retainer 52 and locator pin 74 drop the sector shaft 18, each of the plurality of gear teeth 122, 222, 322 moves toward a respective one of the plurality of cogs 138, 238, 338, 438 to minimize the first thickness 58 (FIG. 3A). Therefore, the steering system 10 (FIG. 1) minimizes the first thickness 58 or lash between the center gear tooth 222 and the respective one 238, 338 of the plurality of cogs 138, 238, 338, 438 when the steering wheel 12 is disposed in the on-center position 14. As such, the steering system 10 provides precise, substantially lash-free steering when the steering wheel 12 is disposed in the on-center position 14.

Stated differently, referring to FIGS. 2-4B, the retainer 52, the locator pin 74, the lash adjuster 48, and the resilient member 34 (FIG. 2) may together suspend the sector shaft 18 along the central longitudinal axis 24 adjacent to the plurality of cogs 138, 238, 338, 438 to thereby minimize the first thickness 58 (FIG. 3A) when the steering wheel 12 is disposed in the on-center position 14 (FIGS. 3A and 4A), and may maintain the second thickness 62 (FIG. 3B) when the steering wheel 12 is disposed in the off-center position 16 (FIGS. 3B and 4B). That is, the steering system 10 (FIG. 1)

may accurately balance compression of the resilient member 34 by the lash adjuster 48, which drops the sector shaft 18 slightly so that the center one 222 of the plurality of gear teeth 122, 222, 322 contacts the respective one 238, 338 of the plurality of cogs 138, 238, 338, 438 when the steering wheel 12 is disposed in the on-center position 14, with suspension or slight lift of the sector shaft 18 provided by the locator pin 74 and the guide surface 78 as the locator pin 74 exits the notch 80 or depression when the steering wheel 12 is disposed in the off-center position 16. As such, the retainer 52 and the resilient member 34 may together minimize the first thickness 58 (FIG. 3A).

As further described with reference to FIGS. 3A-4B, for the aforementioned embodiment including three gear teeth 122, 222, 322 protruding from the sector shaft 18 and four cogs 138, 238, 338, 438 protruding from the rack ball nut 36, when the steering wheel 12 (FIG. 1) is disposed in the on-center position 14 (FIGS. 3A and 4A), the center one 222 of the three gear teeth 122, 222, 322 may mesh with the center one 240 of the three grooves 140, 240, 340 to define the first gap 56 (FIG. 3A) having the first thickness 58 (FIG. 3A) between the center one 222 of the three gear teeth 122, 222, 322 and one 238, 338 of the four cogs 138, 238, 338, 438. However, when the steering wheel 12 is disposed in the off-center position 16 (FIGS. 3B and 4B), the outer one 122 of the three gear teeth 122, 222, 322 may mesh with the outer one 140 of the three grooves 140, 240, 340 to define the second gap 60 (FIG. 3B) having the second thickness 62 (FIG. 3B) that is greater than the first thickness 58 between the outer one 122 of the three gear teeth 122, 222, 322 and the outer one 138 of the four cogs 138, 238, 338, 438.

In particular, with continued reference to FIGS. 3A-4B, the locator pin 74 may translate away from the notch 80 or depression defined by the retainer 52 and space each of the three gear teeth 122, 222, 322 away from the respective one of the four cogs 138, 238, 338, 438 as the steering wheel 12 (FIG. 1) rotates from the on-center position 14 (FIGS. 3A and 4A) to the off-center position 16 (FIGS. 3B and 4B). Subsequently, when a steering maneuver is complete, the locator pin 74 may rest within the notch 80 or depression and translate each of the three gear teeth 122, 222, 322 towards the respective one of the four cogs 138, 238, 338, 438 as the steering wheel 12 rotates from the off-center position 16 to the on-center position 14. Further, the retainer 52 may drop the sector shaft 18 along the central longitudinal axis 24 away from the end cap cover 64 as the steering wheel 12 rotates from the off-center position 16 to the on-center position 14 to thereby minimize the first thickness 58 and any lash perceived by a vehicle operator during on-center steering.

Therefore, the steering system 10 (FIG. 1) provides precise and efficient steering whether the steering wheel 12 (FIG. 1) is disposed in the on-center position 14 (FIGS. 1, 3A, and 4A) or the off-center position 16 (FIGS. 3B and 4B). That is, the steering system 10 maintains the sector shaft 18 in a desired vertical position along the central longitudinal axis 24 and provides for substantially lash-free on-center steering. Even as continuous cycling of the steering wheel 12 between the on-center position 14 and the off-center position 16 may wear the plurality of gear teeth 122, 222, 322 and/or the plurality of cogs 138, 238, 338, 438, the sector shaft 18 may continually align to the desired vertical position along the central longitudinal axis 24. Therefore, even at end-of-life operating conditions, an interface between the plurality of gear teeth 122, 222, 322 and plurality of cogs 138, 238, 338, 438 is substantially lash-free when the steering wheel 12 is disposed in the on-center position 14.

While the best modes for carrying out the disclosure have been described in detail, those familiar with the art to which this disclosure relates will recognize various alternative designs and embodiments for practicing the disclosure within the scope of the appended claims.

The invention claimed is:

1. A steering system comprising:
   a steering wheel rotatable between an on-center position and an off-center position;
   a sector shaft having a plurality of gear teeth protruding therefrom, wherein the sector shaft has a proximal end defining a cavity therein and a distal end spaced apart from the proximal end along a central longitudinal axis, and wherein the sector shaft is rotatable about the central longitudinal axis that is substantially perpendicular to the plurality of gear teeth as the steering wheel rotates between the on-center position and the off-center position;
   a resilient member disposed within the cavity;
   a rack ball nut having a plurality of cogs extending therefrom and defining a plurality of grooves therebetween, wherein each of the plurality of gear teeth is matable with a respective one of the plurality of grooves;
   a lash adjuster translatable within the cavity along the central longitudinal axis;
   a washer sandwiched between the resilient member and the lash adjuster;
   a retainer disposed in contact with the lash adjuster and the sector shaft and configured for positioning the sector shaft along the central longitudinal axis as the steering wheel rotates between the on-center position and the off-center position;
   wherein a center one of the plurality of gear teeth meshes with a center one of the plurality of grooves to define a first gap having a first thickness between the center one of the plurality of gear teeth and one of the plurality of cogs when the steering wheel is disposed in the on-center position;
   wherein an outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position; and
   an end cap cover disposed in contact with the retainer and threadably mated to the lash adjuster, wherein the end cap cover is not rotatable about the central longitudinal axis.

2. The steering system of claim 1, wherein the steering wheel rotates between the on-center position and the off-center position to translate the rack ball nut along an axis that is substantially perpendicular to the central longitudinal axis and thereby rotate the sector shaft about the central longitudinal axis.

3. The steering system of claim 1, wherein the sector shaft includes three gear teeth protruding from the proximal end, and the rack ball nut includes four cogs protruding therefrom.

4. The steering system of claim 1, wherein the retainer includes a peg extending therefrom and disposed parallel to the central longitudinal axis, and further wherein the end cap cover defines a hole therein configured for receiving the peg so that the retainer does not rotate with respect to the end cap cover about the central longitudinal axis.

5. The steering system of claim 1, wherein the lash adjuster is rotatable with respect to the end cap cover to translate the washer along the central longitudinal axis towards the distal end, compress the resilient member, and thereby decrease the first thickness.

6. The steering system of claim 1, wherein the sector shaft further includes a locator pin protruding therefrom at the proximal end and disposed substantially perpendicular to the central longitudinal axis.

7. The steering system of claim 6, wherein the retainer, the locator pin, the lash adjuster, and the resilient member together suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

8. The steering system of claim 6, wherein the retainer defines an annular channel therein configured for receiving the locator pin, and having a guide surface including a notch.

9. The steering system of claim 8, wherein the locator pin is disposed within the notch when the steering wheel is disposed in the on-center position to thereby minimize the first thickness.

10. The steering system of claim 8, wherein the locator pin is not disposed within the notch when the steering wheel is disposed in the off-center position to thereby maintain the second thickness.

11. The steering system of claim 8, wherein the locator pin translates away from the notch so that the retainer lifts the sector shaft along the central longitudinal axis toward the end cap cover, and thereby spaces each of the plurality of gear teeth away from a respective one of the plurality of cogs as the steering wheel rotates from the on-center position to the off-center position.

12. The steering system of claim 11, wherein the locator pin rests within the notch so that the retainer drops the sector shaft along the central longitudinal axis away from the end cap cover, and thereby translates each of the plurality of gear teeth towards a respective one of the plurality of cogs as the steering wheel rotates from the off-center position to the on-center position.

13. The steering system of claim 1, wherein the lash adjuster has an annular shoulder disposed in contact with the retainer, and further wherein the lash adjuster is rotatable with respect to the retainer.

14. A steering system comprising:
a steering wheel rotatable between an on-center position and an off-center position;
a sector shaft having a plurality of gear teeth and a locator pin protruding therefrom, wherein the sector shaft defines a cavity therein and is rotatable about a central longitudinal axis that is substantially perpendicular to the plurality of gear teeth as the steering wheel rotates between the on-center position and the off-center position;
a rack ball nut translatable along an axis that is substantially perpendicular to the central longitudinal axis as the steering wheel rotates between the on-center position and the off-center position, wherein the rack ball nut has a plurality of cogs extending therefrom and defining a plurality of grooves therebetween, and further wherein each of the plurality of gear teeth is matable with a respective one of the plurality of grooves;
a lash adjuster translatable within the cavity along the central longitudinal axis and having an annular shoulder;
a retainer disposed in contact with the annular shoulder and the sector shaft and configured for positioning the sector shaft along the central longitudinal axis as the steering wheel rotates between the on-center position and the off-center position, wherein the retainer is not rotatable about the central longitudinal axis;
a resilient member disposed within the cavity;
a washer sandwiched between the resilient member and the lash adjuster; and
an end cap cover disposed in contact with the retainer and threadably mated to the lash adjuster, wherein the end cap cover is not rotatable about the central longitudinal axis;
wherein a center one of the plurality of gear teeth meshes with a center one of the plurality of grooves to define a first gap having a first thickness between the center one of the plurality of gear teeth and one of the plurality of cogs when the steering wheel is disposed in the on-center position;
wherein an outer one of the plurality of gear teeth meshes with an outer one of the plurality of grooves to define a second gap having a second thickness that is greater than the first thickness between the outer one of the plurality of gear teeth and an outer one of the plurality of cogs when the steering wheel is disposed in the off-center position;
wherein the lash adjuster is rotatable with respect to the end cap cover to compress the resilient member and thereby decrease the first thickness; and
wherein the retainer, the locator pin, the lash adjuster, and the resilient member together suspend the sector shaft along the central longitudinal axis adjacent to the plurality of cogs to thereby minimize the first thickness when the steering wheel is disposed in the on-center position, and maintain the second thickness when the steering wheel is disposed in the off-center position.

15. The steering system of claim 14, wherein the retainer and the resilient member together minimize the first thickness.

16. A steering system comprising:
a steering wheel rotatable between an on-center position and an off-center position;
a sector shaft having three gear teeth and a locator pin protruding therefrom, wherein the sector shaft defines a cavity therein and is rotatable about a central longitudinal axis that is substantially perpendicular to the three gear teeth as the steering wheel rotates between the on-center position and the off-center position;
a rack ball nut translatable along an axis that is substantially perpendicular to the central longitudinal axis as the steering wheel rotates between the on-center position and the off-center position, wherein the rack ball nut has four cogs extending therefrom and defining three grooves therebetween, and further wherein each of the three gear teeth is matable with a respective one of the three grooves;
a lash adjuster translatable within the cavity along the central longitudinal axis;
a retainer disposed in contact with the lash adjuster and the sector shaft and configured for positioning the sector shaft along the central longitudinal axis as the steering wheel rotates between the on-center position and the off-center position;
wherein the retainer is not rotatable about the central longitudinal axis, includes a peg extending therefrom and disposed parallel to the central longitudinal axis, and defines an annular channel therein configured for receiving the locator pin and having a guide surface including a notch;
a resilient member disposed within the cavity;

a washer sandwiched between the resilient member and the lash adjuster; and an end cap cover disposed in contact with the retainer and threadably mated to the lash adjuster, wherein the end cap cover is not rotatable about the central longitudinal axis and defines a hole therein configured for receiving the peg so that the retainer does not rotate with respect to the end cap cover about the central longitudinal axis;

wherein a center one of the three gear teeth meshes with a center one of the three grooves to define a first gap having a first thickness between the center one of the three gear teeth and one of the four cogs when the steering wheel is disposed in the on-center position;

wherein an outer one of the three gear teeth meshes with an outer one of the three grooves to define a second gap having a second thickness that is greater than the first thickness between the outer one of the three gear teeth and an outer one of the four cogs when the steering wheel is disposed in the off-center position;

wherein the locator pin translates away from the notch and spaces each of the three gear teeth away from a respective one of the four cogs as the steering wheel rotates from the on-center position to the off-center position; and wherein the locator pin rests within the notch and translates each of the three gear teeth towards a respective one of the four cogs as the steering wheel rotates from the off-center position to the on-center position.

17. The steering system of claim 16, wherein the retainer drops the sector shaft along the central longitudinal axis away from the end cap cover as the steering wheel rotates from the off-center position to the on-center position to thereby minimize the first thickness.

* * * * *